United States Patent
Don et al.

(10) Patent No.: US 7,370,051 B2
(45) Date of Patent: May 6, 2008

(54) DATABASE DRIVEN TYPE EXTENSIBILITY

(75) Inventors: Cliff M. R. Don, Bellevue, WA (US); Remi A. J. Lemarchand, Redmond, WA (US); Jason C. Mayans, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 477 days.

(21) Appl. No.: 10/602,126

(22) Filed: Jun. 24, 2003

(65) Prior Publication Data
US 2004/0267755 A1 Dec. 30, 2004

(51) Int. Cl.
*G06F 7/00* (2006.01)
*G06F 17/30* (2006.01)

(52) U.S. Cl. .................. 707/10; 707/201; 707/203; 707/103 X; 709/203

(58) Field of Classification Search ............ 707/1–206, 707/10, 103 X; 709/201–253; 711/1–221
See application file for complete search history.

(56) References Cited

U.S. PATENT DOCUMENTS

| | | | |
|---|---|---|---|
| 5,999,947 A * | 12/1999 | Zollinger et al. ............ 707/203 |
| 6,247,057 B1 * | 6/2001 | Barrera, III .................. 709/229 |
| 6,341,291 B1 * | 1/2002 | Bentley et al. ............. 707/203 |
| 6,374,260 B1 * | 4/2002 | Hoffert et al. ............ 707/104.1 |
| 6,477,543 B1 * | 11/2002 | Huang et al. ................ 707/200 |
| 6,578,068 B1 * | 6/2003 | Bowman-Amuah ......... 709/203 |
| 6,889,229 B1 * | 5/2005 | Wong et al. ................. 707/102 |
| 6,912,522 B2 * | 6/2005 | Edgar ............................. 707/2 |
| 6,941,299 B2 * | 9/2005 | Heuer ............................ 707/4 |
| 6,968,355 B2 * | 11/2005 | Baldwin et al. ............. 709/201 |
| 7,072,974 B2 * | 7/2006 | Hepworth et al. .......... 709/236 |
| 7,076,541 B1 * | 7/2006 | Burstein et al. ............. 709/223 |
| 7,080,361 B2 * | 7/2006 | Aigen ......................... 717/137 |
| 2002/0095487 A1 * | 7/2002 | Day et al. .................... 709/223 |
| 2002/0156792 A1 * | 10/2002 | Gombocz et al. ........... 707/100 |
| 2002/0188610 A1 * | 12/2002 | Spencer, Jr. .................. 707/10 |
| 2004/0128400 A1 * | 7/2004 | Srinivasan et al. .......... 709/250 |

\* cited by examiner

*Primary Examiner*—Tim Vo
*Assistant Examiner*—Jay A Morrison
(74) *Attorney, Agent, or Firm*—Workman Nydegger

(57) ABSTRACT

Data types can be created, modified and deployed in multi-tier database systems by using extended assemblies. The extended assemblies are created by a back end server using the data and code contained in special tables and object tables of the back end server. The back end server determines which data types are to be deployed in the system, based on push or pull conditions. Thereafter, the corresponding extended assemblies are to be obtained and sent to one or more middle tier servers that utilize the extended assemblies to use the data types. However, some of the middle tier servers may need to be configured with appropriate logic modules prior to utilizing the extended assemblies. A data type can be created or modified by creating or editing data and code contained in the special table and object tables prior to creating the extended assemblies.

34 Claims, 4 Drawing Sheets

| TypeId | Type Name | Type (Extended) Assembly |
|---|---|---|
| "c9135c04-db66-430e-8015-aa69b4874a20" | EmailMessage 340 | [Library Code for EmailMessage object] |
| "a8132d05-ca48-842" | PatentApplication 350 | [Library Code for PatentApplication object] |

Fig. 3

DATABASE DRIVEN TYPE EXTENSIBILITY

BACKGROUND OF THE INVENTION

1. The Field of the Invention

The present invention relates to multi-tier database systems in which one or more servers obtain data from at least one other server and, more particularly, to extending use of data types in multi-tier database systems.

2. Background and Relevant Art

In existing multi-tier database systems that include a back end server and one or more middle tier servers, types of data objects are defined separately by each of the servers. In particular, each server defines the types of data that can be used and stores the corresponding code for utilizing the data types. Although this configuration is useful for enabling each of the servers to utilize the various shared data types, it also requires that the definitions and code corresponding to each of the data types be manually installed into each of the servers.

To overcome this type of redundant data storage, some multi-tier database systems enable the definitions and code of the data types to be copied between the servers. Enabling each of the servers to randomly copy and transmit data type definitions and code, however, can lead to compatibility and consistency problems. In particular, the absence of a centralized location from which the data types are deployed increases the likelihood that the appropriate definitions and code will not be propagated at a desired time or in a desired manner. For example, when the definitions or code corresponding to a data type are copied between middle tier servers, these definitions and code may be incompatible with newer versions that have been modified or added at the back end server, thereby preventing use of the data type between the back end server and the middle tier server.

These problems can be accentuated even further when considering embodiments in which new middle tier servers are added to existing distributed database systems. In particular, new middle tier servers may support new data types or different sets of data types previously recognized. Alternatively, the new middle tier server may not recognize or support all of the data types that are currently being used in the distributed system. In such environments it becomes necessary for each of the servers to continually monitor each of the remaining servers for new data types and to update their own data type registries, definitions and code to conform to the new or modified data types for compatibility.

For at least the foregoing reasons, there currently exists a need in the art for improved methods and systems for creating, modifying and deploying new data types in multi-tier database systems.

BRIEF SUMMARY OF THE INVENTION

The present invention relates to methods, systems and computer-program products for enabling the creation, use, and deployment of data types in multi-tier database systems.

According to one embodiment, one or more middle tier servers obtain data from a back end server database. Although not necessary, the back end server can include a relational database server, such as, but not limited to, a SQL server and the one or more middle tier servers can include an email server, such as, but not limited to, the Microsoft Exchange server. The database of the back end server includes a special table that identifies data types and includes code for utilizing the data types. The special table can also be linked to one or more other tables that further define the data types.

When a new data type is to be created or an existing data type is to be modified, the definitions and code corresponding to the data type can be created and modified in the tables that are stored in the back end server database, without requiring the updates to be entered by hand into each of the middle tier servers.

In one embodiment, each of the one or more middle tier servers that are associated with the back end server are configured with logic that allows them to query the back end server for collections of code that are referred to herein as extended assemblies that define the data types and include the library code that is required to utilize the data types. Accordingly, the code and definitions associated with the data types that are utilized by the multi-tier system can be loaded from a single centralized location comprising the back end server database.

It will be appreciated that, according to the invention, the extended assemblies can be extended to the middle tier servers through both push and pull embodiments. In particular, middle tier servers can directly request, e.g., pull, the extended assemblies from the back end server. In which case, the back end server will satisfy the requests by providing the extended assemblies that have been requested. Likewise, the back end server can also push the extended assemblies to the one or more middle tier servers without first receiving a request. Any combination of push and pull embodiments can also be used within the scope of the invention.

The invention also extends to embodiments in which the definitions or code corresponding to a data type are modified and the modifications are deployed throughout the distributed multi-tier system through any combination of push and pull embodiments.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates one embodiment of a special table that is stored in the database associated with a back end server of a distributed server system.

DETAILED DESCRIPTION OF THE PREFERRED EMBODIMENTS

Figure 1:
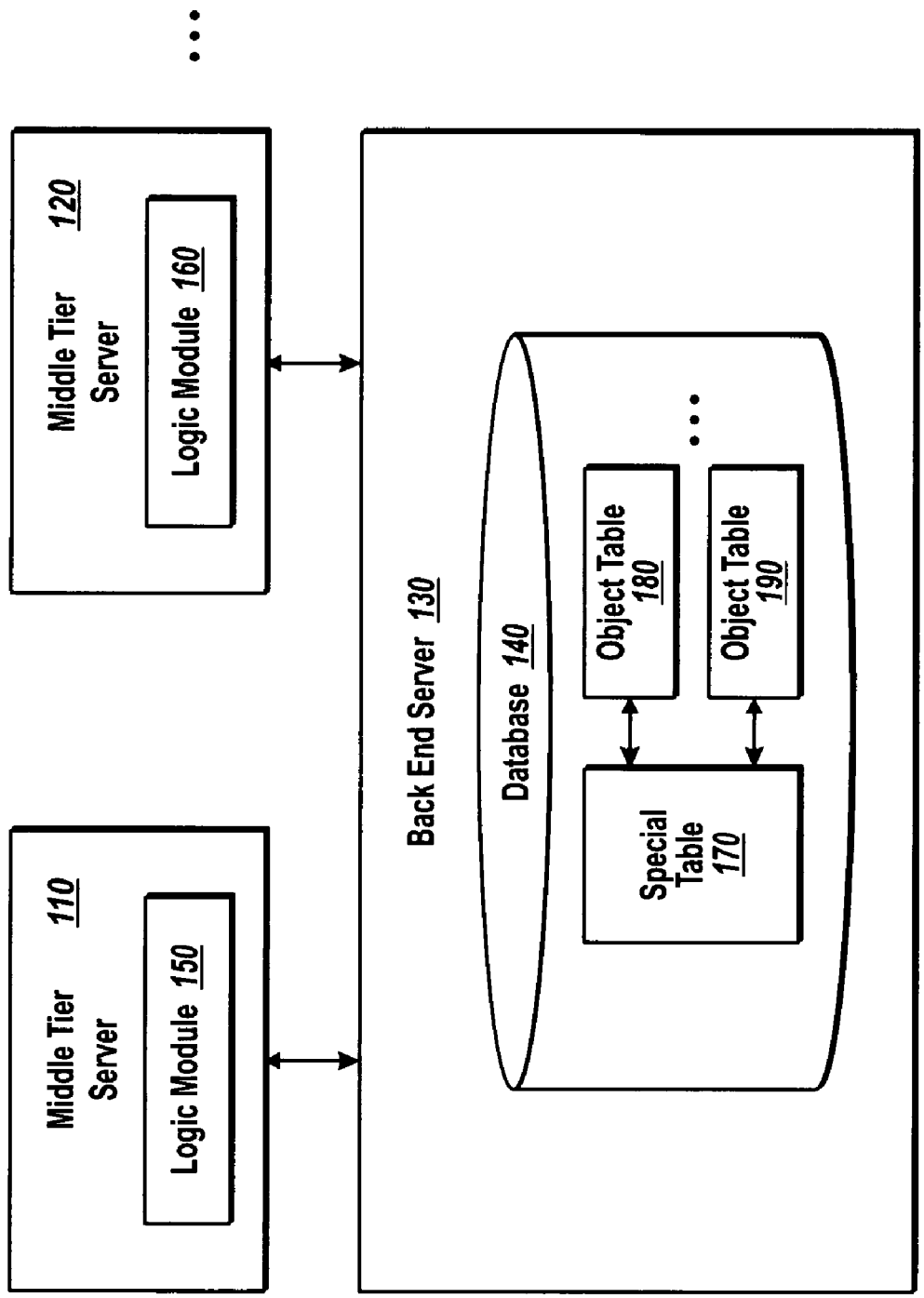
FIG. 1 illustrates a block diagram of one embodiment of a multi-tier database system that may be used for performing methods of the invention and that includes a back end server and two middle tier servers.

The present invention extends to methods, systems and computer-program products for enabling the creation, use, and deployment of data types in multi-tier database systems.

The term "multi-tier database system," as defined herein, should be broadly construed to include a system that includes a back end server and at least one middle tier server that obtains data from the back end server. In certain embodiments described herein, the back end server comprises a relational database, such as, but not limited to, Microsoft's (SQL) server and the at least one middle tier server includes an email server, such as, but not limited to, Microsoft's Exchange server. However, it will be appreciated that the scope of the invention extends to various other embodiments that include various other server types. The term "multi-tier database system" is at times used interchangeably herein with the term "distributed system" and "distributed server system".

The terms "extend" and "deploy," which are at times used interchangeably herein, should be broadly construed to mean transmit, send, promulgate, spread, make available or otherwise communicate.

The term "extended assembly," as defined herein, should be construed to include the code and other information that defines and enables use of the data type to which the extended assembly corresponds.

The term "data type," should be broadly construed herein as a category or class of data. The term "data type" is at times used interchangeably herein with the term "type of data." Objects are also referred to herein at times as one of many potential data types. By way of example, data types that can be utilized by an email server include, but are not limited to, text email messages, word processing documents, audio clips, graphical images, and so forth, each of which may exist in various file formats.

According to the invention, a back end server is configured with a special table and one or more other tables that identify and define data types and the corresponding code that is required to enable use of the data types. These tables can be modified to add/delete/edit data type entries at the back end server. Thereafter, these modifications are extended to the one or more middle tier servers that are associated with the back end server. These modifications made to the tables are thereafter made available to the middle tier servers, thereby extending the new data types, which are created by the modifications, to the middle tier servers.

As should be appreciated from the forgoing, the code and definitions associated with the new data types can be modified and obtained from a single and centralized location, such that each of the middle tier servers does not have to continually monitor each of the other middle tier servers for new data types and corresponding updates. Accordingly, new data types and corresponding updates no longer have to be manually deployed to each of the middle tier servers within the distributed multi-tier system. Conformity between the various middle tier servers can also be realized. In particular, since the code and definitions of the data types are obtained from a single location, the risk of having multiple different and inconsistent definitions and data types is reduced. Additional advantages and features of the invention will be described in more detail below and can be realized by practicing the invention.

As described herein, embodiments of the present invention can include special purpose and general-purpose computing devices including various computer hardware, as discussed in greater detail below. The embodiments within the scope of the present invention can also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

As should be appreciated from the foregoing, the code and definitions associated with the new data types can be modified and obtained from a single and centralized location, such that each of the middle tier servers does not have to continually monitor each of the other middle tier servers for new data types and corresponding updates. Accordingly, new data types and corresponding updates no longer have to be manually deployed to each of the middle tier servers within the distributed multi-tier system. Conformity between the various middle tier servers can also be realized. In particular, since the code and definitions of the data types are obtained from a single location, the risk of having multiple different and inconsistent definitions and data types is reduced. Additional advantages and features of the invention will be described in more detail below and can be realized by practicing the invention.

According to embodiments of the invention, as described herein, the middle tier servers obtain data that is stored in a database 140 of the back end server 130. In particular, each of the middle tier servers 110 and 120 includes a logic module 150 and 160, respectively, that enables the middle tier servers 110 and 120 to communicate with the back end server 130 and to query for extended assemblies that define and enable the use of data types. In the present embodiment, the logic modules 150 and 160 include copies of the same code for enabling communication with the back end server 130. In other embodiments, however, slight modifications may exist between the modules 150 and 160 as may be required for different systems.

According to the invention, the logic modules 150 and 160 include sufficient computer-executable instruction for enabling the middle tier servers 110 and 120 to query for and receive extended assemblies that comprise information contained in the special table 170 and one or more object tables 180 and 190 of database 140, as described below in more detail.

Although, in the present illustration, only two object tables 180 and 190 are explicitly identified, it will be appreciated that the embodiments of the invention are not limited to any particular number of object tables. Likewise, the term object tables should not be construed as limiting the scope of the invention. Rather, the special table 170 can be associated with any number of tables that contain any amount of information that is required to define and identify data types and enable the creation of extended assemblies.

In one embodiment, the back end server 130 comprises a SQL server and at least one of the middle tier servers 110 or 120 includes an email server such as an email Exchange server. In such an embodiment, the Exchange server is configured to communicate with the SQL server to obtain data stored in the database 140 that is associated with the SQL server. One type of information or data that can be obtained from the SQL server, according to the invention, includes extended assemblies that define and enable the use of data types by the middle-tier servers. For example, an Exchange server may receive an extended assembly from the SQL server that defines and enables the use of a new text messaging type, or another data type Attention will now be directed to FIG. 2, which illustrates a flow chart 200 of one embodiment of a method for creating, modifying and deploying data types in multi-tier database systems. As shown, the method includes various acts (acts 210, 220, 230, 240, 250 and 260) and a step (step 270) that can be performed to enable certain embodiments of the invention.

The first illustrated act includes the creation or modification of a special table in the back end server database. This special table, which can be configured in various formats, generally identifies data types and includes the code required to enable the use of the data types.

One nonlimiting example of a special table 300 is illustrated in FIG. 3. In the present embodiment, the special table 300 includes a TypeId column 310, a Type Name column 320, and a Type (Extended) Assembly column 330. The TypeId column 310 includes fields that store binary identifications of the data types. The Type Name column 320 includes fields that store text names of the data types and the Type (Extended) Assembly 330 include fields that contain the code that enables the use of the data types by the various computing devices in the distributed multi-tier system.

Figure 2:
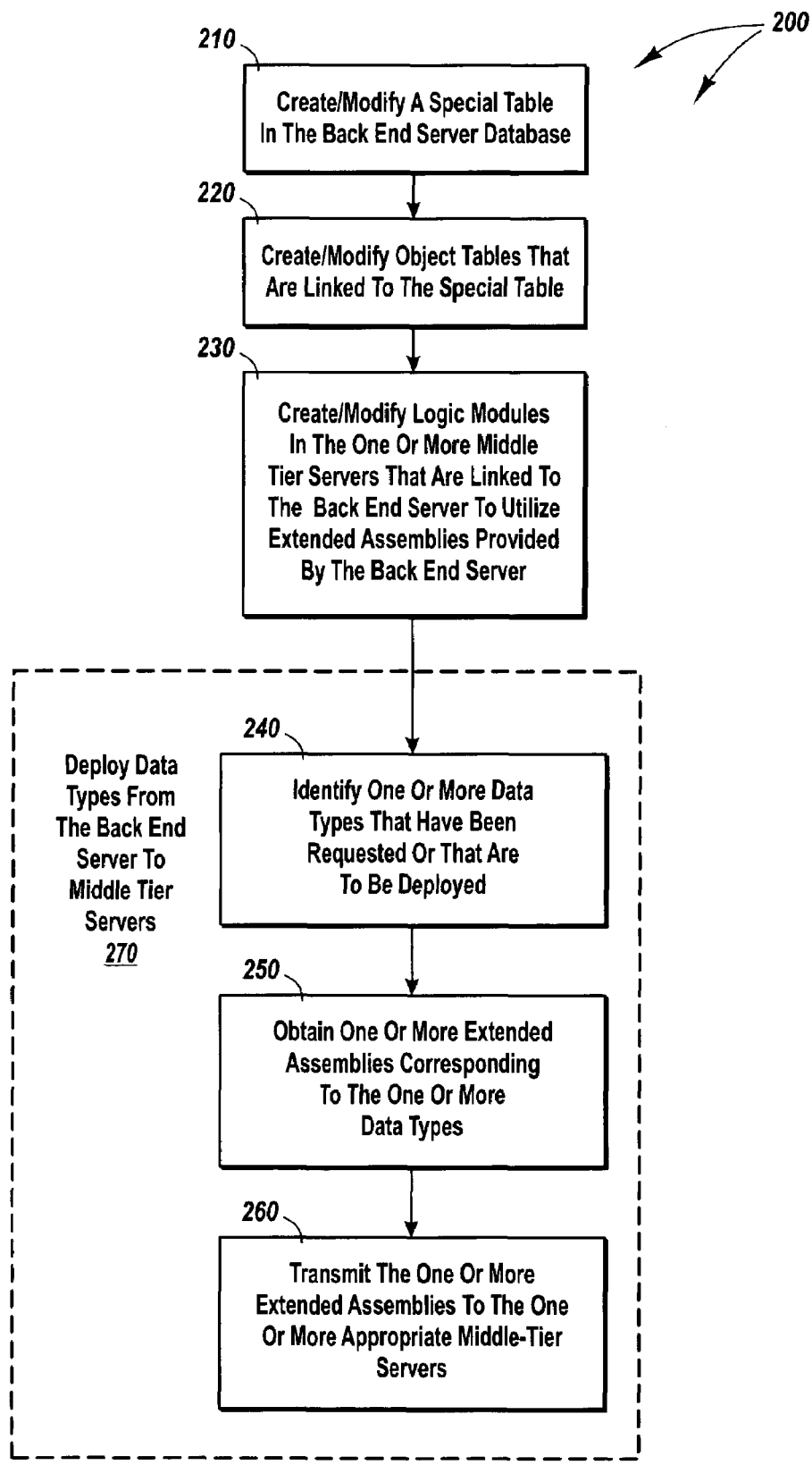
FIG. 2 illustrates a flow chart of one embodiment of a method for creating, modifying and/or deploying data types in a distributed server system.

Referring now back to the flowchart 200 of FIG. 2, it is shown how the methods of the invention also include an act for creating or modifying object tables that are linked to the special table, act 220. The object tables can include other information corresponding to or defining the data types that is not already defined in the special table.

By way of example, an object table corresponding to the EmailMessage type 340 could specify additional information that pertains to the EmailMessage type and that is not already included in the special table that associates the code with the corresponding object types. The additional information that can be included within the object tables can include any desired information. For the EmailMessage type, for example, the object table could include such data as a message ID, a sender, a recipient, a body, and so forth. Whereas an object table corresponding to the PatentApplication type 350 might include information that enables the identification of a patent application ID, a description of the patent, an application date, a filing date, the inventors, the assignee, and so forth. These additional object tables, which are configured to contain data corresponding to the various data types (e.g., EmailMessage type and PatentApplication type), can include the object tables 180 and 190 shown in FIG. 1.

Despite the foregoing examples, however, it will be appreciated that the invention is not limited to any particular type of object table or any amount of information that is defined or that can be identified with the object tables.

The next illustrated act, act 230, includes the creation or modification of logic modules in the one or more middle tier servers that are linked to the back end server so that they can utilize the extended assemblies provided by the back end server. The logic modules described herein, and illustrated in FIG. 1 as modules 150 and 160, generally include computer-executable instructions for enabling the middle tier servers to communicate with the back end server in push and/or pull environments, and to receive the extended assemblies that define and enable data types to be utilized by the middle tier servers.

In some embodiments the logic modules 160 may already exist or may not require modification. In such embodiments, the scope of the invention extends to methods in which the act of creating or modifying the logic modules is not required.

As shown in FIG. 2, certain methods of the invention may also include the step for deploying data types from the back end server to the middle tier servers (step 270). It will be appreciated that step 270 is a functional result oriented step that can include any number or combination of corresponding acts that enable the deployment of the extended assemblies. In the present embodiment, the corresponding acts include acts 240, 250 and 260, each of which will now be described.

The act of identifying one or more data types to be deployed, act 240, can be performed by the back end server or the middle tier servers. In particular, the back end server can identify one or more data types it wishes to deploy to any number of the one or more middle tier servers that are in the distributed server system. Likewise, any number of the middle tier servers can specifically request or specify which of the data types it wishes to receive information about or that it desires to enable. Upon making such a request, the back end server can then create one or more extended assemblies with code and other information that satisfies the middle server request (act 250).

The act of obtaining an extended assembly (act 250) may be as simple as identifying data contained in one or more of the fields of the special table (e.g., the Type (Extended) Assembly field 330 data). It may also involve the acts of querying and obtaining data from one or more of the corresponding object tables. Obtaining an extended assembly may also involve processing the data of the extended assembly into a format that can be handled and processed by the middle tier servers.

Once an extended assembly is created, it can be transmitted to the one or more appropriate middle tier servers (act 260) that requested the extended assembly (e.g., in a pull system) or that have been determined by the back end server as appropriate destinations (e.g., in a push system). Any combination of the above can also be performed.

One benefit that can be realized from practicing the invention is that a user does not have to manually deploy each modification or new data type into each computing system utilized in a multi-tier database system. Likewise, the methods of the invention promote the consistent use of data type definitions and code between the various computing devices and servers in the distributed server system by providing a single and central location from which all of the data type definitions and code can be obtained and modified.

Even though specific examples have been provided above, with regard to the method illustrated in FIG. 2, it will be appreciated that the acts illustrated in the method do not necessarily have to be performed in the order illustrated. For example, the act of creating/modifying logic modules in the middle tier servers (act 230) can occur prior to or contemporaneously with the creation of the special table (act 210) and the object tables (act 220).

Likewise, the methods of the invention also extend to other embodiments in which new middle tier servers are connected to an existing distributed server system or to an existing back end server. In such embodiments, the methods of the invention may include determining what extended assemblies to deploy to the new middle tier server, such as, for example, based upon an analysis that the middle tier server does not yet support all of the data types defined and enabled by the back end server.

Embodiments of the invention also extend to methods in which a user can customize or create data types and install the data types into the back end server for later deployment by the back end server. The manner in which the user can customize and create data types can include the modification/creation of the special table and corresponding object tables to define and enable the intended data types. In such embodiments, any suitable user interfaces can be employed by the user to modify or add data to the special table and object tables.

Computing Environment

It will be appreciated by those skilled in the art that the invention may be practiced in computing systems and network computing environments with various configurations, including personal computers, hand-held devices, multiprocessor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Figure 4:
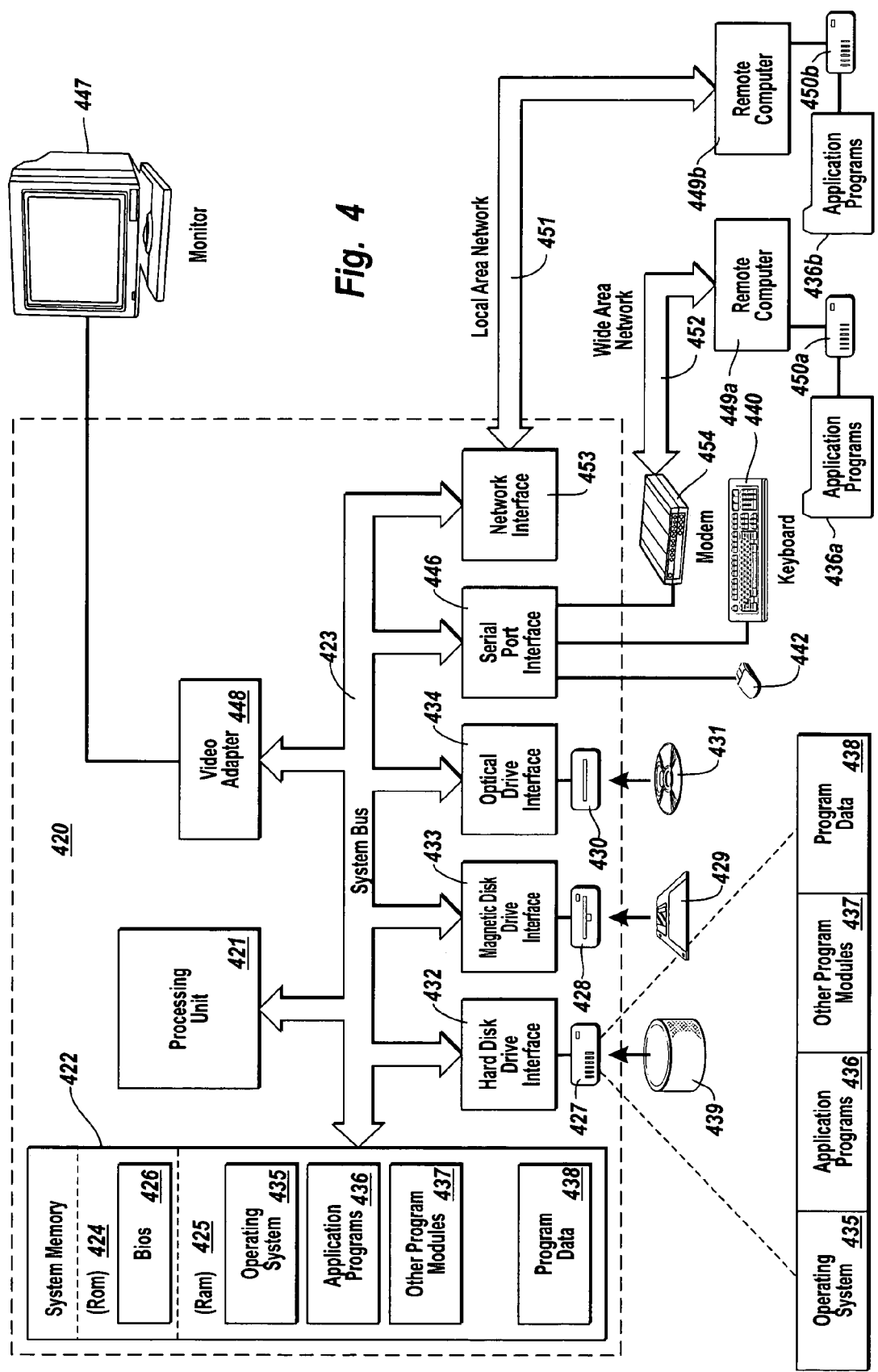
FIG. 4 illustrates a block diagram of one embodiment of a computing environment that may be used while performing methods of the invention.

With reference to FIG. 4, an exemplary system for implementing the invention includes a general purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disk drive 430 for reading from or writing to removable optical disk 431 such as a CD-ROM, DVD-ROM or other optical media. The magnetic hard disk drive 427, magnetic disk drive 428, and optical disk drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 439, magnetic disk 429, optical disk 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 may operate in a networked environment using logical connections to one or more remote computers, such as remote computers 449a and 449b. Remote computers 449a and 449b may each be another personal computer, a server, a router, a network PC, a peer device or other common network node, and typically include many or all of the elements described above relative to the computer 420, although only memory storage devices 450a and 450b and their associated application programs 436a and 436b have been illustrated in FIG. 4. The logical connections depicted in FIG. 4 include a local area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the local network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a multi-tier server system that includes a back end server at a first tier and a plurality of additional servers at a middle tier, each additional server using multiple types of data objects that must be defined on the plurality of additional servers before the data objects can be used by the plurality of middle tier servers, a method for deploying one or more data types from the back end server to the plurality of middle tier servers in a manner that maintains consistency and compatibility in the definitions of the data types and in code associated with each data type as stored on each middle tier server in the system, the method comprising:

an act of creating a special table in a database of the back end server, the special table including a plurality of data elements storing data identifying data types used by the plurality of middle tier servers, each data element including:
a data type identification field;
a code field containing any code necessary for enabling use of a corresponding data type; and
a link to one or more data type specific tables containing information further defining the corresponding data type,
wherein the database of the back end server acts as a repository for each data type used by any of the plurality of middle tier servers, and the back end server acts as a single and centralized source from which each of the plurality of middle tier servers obtains all data types used by any other of the plurality of middle tier servers and the corresponding code required to enable use of the data types by the plurality of middle tier servers, and such that the plurality of middle tier servers each obtain all data types from the single and centralized source which operates at a different tier than the plurality of middle tier servers;
an act of identifying a data type to be deployed from the back end server to one or more of the plurality of middle tier servers;
an act of obtaining an extended assembly that corresponds to the data type to be deployed, the extended assembly including data obtained using the special table, including data identifying the data type, one or more definitions of the data type, and the code for enabling processing of data corresponding to the data type, the extended assembly being generated after the act of identifying the data type to be deployed; and
an act of transmitting the extended assembly to the one or more middle tier servers of the plurality of middle tier servers in the multi-tier system such that the data type, as transmitted to and received by the one or more of the plurality of middle tier servers in the multi tier system, is consistent and compatible with a data type of the same kind stored on other middle tier servers in the system.

2. A method as recited in claim 1, further including an act of creating logic modules in one or more of the plurality of middle tier servers that enable the one or more of the plurality of middle tier servers to query for the extended assembly.

3. A method as recited in claim 1, wherein the back end server includes a relational database.

4. A method as recited in claim 3, wherein the back end server comprises an SQL server.

5. A method as recited in claim 1, wherein the one or more of the plurality of middle tier servers includes an email server.

6. A method as recited in claim 1, wherein the act of identifying the data type to be deployed includes determining that the one or more of the plurality of middle tier servers has requested the extended assembly, since the one or more of the plurality of middle tier servers are not yet enabled for the data type.

7. A method as recited in claim 6, further including an act of adding a new middle tier server to the multi-tier system, and wherein the new middle tier server comprises the one or more of the plurality of middle tier servers that has requested the extended assembly.

8. A method as recited in claim 1, further including an act of creating one or more object tables that are linked to the special table and that include additional information defining the data type to be deployed, such that the extended assembly also includes the additional information.

9. In a multi-tier server system that includes a back end server at a first tier and a plurality of additional servers at a middle tier, each additional server using multiple types of data objects that must be defined on the plurality of additional servers before the data objects can be used by the plurality of middle tier servers, a method for deploying one or more data types from the back end server to the plurality of middle tier servers in a manner that maintains consistency and compatibility in the definitions of the data types and in code associated with each data type as stored on each middle tier server in the system, the method comprising:

an act of modifying a special table in a database of the back end server, the special table including a plurality of data elements storing data that identifies data types used by the plurality of middle tier servers and includes:
a data type identification field;
a code field containing any code necessary for enabling use of a corresponding data type; and
a link to one or more data type specific tables containing information further defining the corresponding data type,
wherein the database of the backend server acts as a repository for each data type used by any of the plurality of middle tier servers, and the back end server acting as a single and centralized source from which all middle tier servers obtain all data types used by any other of the plurality of middle tier servers and the corresponding code required to enable use of the data types by the plurality of middle tier servers, and such that the plurality of middle tier servers each obtain all data types from the single and centralized source which operates at a different tier than the plurality of middle tier servers, the act of modifying including at least one of modifying the stored data within the one or more fields and adding new stored data to the one or more fields;
an act of identifying a data type to be deployed from the back end server to one or more of the plurality of middle tier servers;
an act of obtaining an extended assembly that corresponds to the data type to be deployed, the extended assembly including at least one of the modified stored data and the new stored data as obtained from the special table, including data identifying the data type, and the executable code that, when executed, enables the one or more middle tier servers to process the modified stored data or the new stored data associated with the data type; and an act of transmitting the extended assembly to the one or more middle tier servers of the plurality of middle tier servers in the multi-tier system such that the data type as transmitted to and received by the one or more of the plurality of middle tier servers in the multi tier system is consistent and compatible with a data type of the same kind stored on other middle tier servers in the system.

10. A method as recited in claim 9, further including an act of determining which of the plurality of middle tier servers should be sent the extended assembly.

11. A method as recited in claim 10, wherein determining which of the plurality of middle tier servers should be sent the extended assembly comprises the acts of:

sending data associated with the data type to the one or more of the plurality of middle tier servers; and receiving one or more requests for the extended assembly from the one or more of the plurality of middle tier servers upon the one or more of the plurality of middle tier servers identifying that the data associated with the data type cannot be processed at the one or more of the plurality of middle tier servers.

12. A method as recited in claim 9, wherein the back end server includes a relational database.

13. A method as recited in claim 9, wherein the back end server comprises an SQL server.

14. A method as recited in claim 9, wherein the one or more of the plurality of middle tier servers includes an email server.

15. A method as recited in claim 9, wherein the act of modifying includes adding new stored data corresponding to a new data type not previously enabled in the multi-tier system prior to adding the new stored data.

16. In a multi-tier server system that includes a back end server at a first tier and a plurality of additional servers at a middle tier, each additional server using multiple types of data objects that must be defined on the plurality of additional servers before the data objects can be used by the plurality of middle tier servers, a method for deploying one or more data types from the back end server to the plurality of middle tier servers in a manner that maintains consistency and compatibility in the definitions of the data types and in code associated with each data type as stored on each middle tier server in the system, the method comprising:

an act of adding a new middle tier server to the multi-tier system, the new middle tier server being configured to utilize extended assemblies that are obtained from the back end server, the back end server acting as a repository for storing each data type used by any of the plurality of middle tier servers, the back end server acting as a single and centralized source from which all middle tier servers obtain all data types used by any other of the plurality of middle tier servers and corresponding code required to enable use of the data types by the plurality of middle tier servers, and such that the plurality of middle tier servers each obtain all data types from the single and centralized source which operates at a different tier than the plurality of middle tier servers, the extended assemblies being configured to enable the use of one or more data types that are defined by data and enabled by executable code that is contained in the extended assemblies;

an act of determining which of the one or more data types are to be deployed from the back end server to the new middle tier server, wherein the act of determining is based at least in part on a request by the new middle tier server for data to enable use of one or more data types;

an act of obtaining one or more extended assemblies corresponding to the one or more data types that have been determined to be deployed, each of the one or more extended assemblies including data and executable code obtained from a special table stored in a database of the back end server, the special table including a plurality of data elements storing data identifying data types and corresponding code for processing data associated with the data types, each data element including:

a data type identification field;

a code field containing any code necessary for enabling use of a corresponding data type; and a link to one or more data type specific tables containing information further defining the corresponding data type; and an act of transmitting, to the new middle tier server, the one or more extended assemblies that correspond to the one or more data types that have been determined to be deployed, such that the one or more data types as transmitted to, and received by, the new middle tier server are consistent and compatible with one or more data types of the same kind on other middle tier servers in the system, and which were received by the other middle tier servers from the back end server.

17. A method as recited in claim 16, wherein the act of determining is further based at least in part on the new middle tier server identifying what other data types are supported, and identifying that the one or more data types to be deployed are not supported at the new middle tier server.

18. In a multi-tier server system that includes a back end server at a first tier and a plurality of additional servers at a middle tier, each additional server using multiple types of data objects that must be defined on the plurality of additional servers before the data objects can be used by the plurality of middle tier servers, a method for deploying one or more data types from the back end server to the plurality of middle tier servers in a manner that maintains consistency and compatibility in the definitions of the data types and in code associated with each data type as stored on each middle tier server in the system, the method comprising:

an act of creating a special table in a database of the back end server, the special table including a plurality of data elements for storing data identifying a data type used by the plurality of middle tier servers, each data element including:

data type identification field;

a code field containing any executable code necessary for enabling processing of data associated with the corresponding data type; and a link to one or data type specific tables containing information further defining the corresponding data type, wherein the database of the back end server acts as a repository for storing each data type used by any of the plurality of middle tier servers, and the back end server acting as a single and centralized source from which all middle tier servers obtain all data types used by any other of the plurality of middle tier servers and the corresponding code required to enable use of the data types by the plurality of middle tier servers, and such that the plurality of middle tier servers each obtain all data types from the single and centralized source which operates at a different tier than the plurality of middle tier servers;

a step for deploying the data type from the back end server to one or more of the plurality of middle tier servers, upon request, such that the data type as transmitted to and received by the one or more of the plurality of middle tier servers in the multi-tier server system is consistent and compatible with a data type of the same kind stored on other middle tier servers in the system.

19. A method as recited in claim 18, wherein the step for deploying the data type to the one or more middle tier servers upon request comprises corresponding acts that include:

an act of identifying the data type to be deployed based on receipt of the data type at the one or more of the plurality of middle-tier servers, and the one or more of the plurality of middle-tier servers requesting an extended assembly for the data type since the data type cannot be processed at the one or more of the plurality of middle tier servers;

an act of obtaining an extended assembly that corresponds to the data type to be deployed, the extended assembly including the data from the special table identifying the data type and the executable code for enabling processing of the data associated with the data type; and an act of transmitting the extended assembly to the one or more of the plurality of middle tier servers in the multi-tier system that requested the extended assembly.

20. A method as recited in claim 19, further including an act of creating logic in the one or more of the plurality of middle tier servers that enables utilization of the extended assembly.

21. A method as recited in claim 19, further including an act of creating at least one object table in the database of the back end server that includes at least some information defining the data type, and wherein the extended assembly includes the at least some information.

22. A computer program product for use in a multi-tier server system that includes a back end server at a first tier and a plurality of additional servers at a middle tier, each additional server using multiple types of data objects that must be defined on the plurality of additional servers before the data objects can be used by the plurality of middle tier servers, the computer program product including one or more computer-readable storage media having stored thereon computer-executable instructions for implementing a method for deploying one or more data types from the back end server to the plurality of middle tier servers in a manner that maintains consistency and compatibility in the definitions of the data types and in code associated with each data type as stored on each middle tier server in the system, the method comprising:

an act of creating a special table in a database of the back end server, the special table including a plurality of data elements storing data identifying data types used by the plurality of middle tier servers, each data element including:

a data type identification field;

a code field containing any code necessary for enabling use of a corresponding data type; and a link to one or more data type specific tables containing information further defining the corresponding data type, wherein the database of the back end server acts as a repository storing each data type used by any of the plurality of middle tier servers, and the back end server acting as a single and centralized source from which each of the plurality of middle tier servers obtains all data types used by any other of the plurality of middle tier servers and the corresponding code required to enable use of the data types by the plurality of middle tier servers, and such that the plurality of middle tier servers each obtain all data types from the single and centralized source which operates at a different tier than the plurality of middle tier servers;

an act of identifying a data type to be deployed from the back end server to one or more of the plurality of middle tier servers;

an act of obtaining an extended assembly that corresponds to the data type to be deployed, the extended assembly including data obtained from the special table, including data identifying the data type, one or more definitions of the data type, and the code for enabling processing of data associated with the data type; and an act of transmitting the extended assembly to one or more of the plurality of middle tier servers in the multi-tier system such that the data type as transmitted to and received by the one or more of the plurality of middle tier servers in the multi tier system is consistent and compatible with a data type of the same kind stored on other middle tier servers in the system.

23. A computer program product as recited in claim 22, wherein the method further includes an act of creating logic modules in the one or more of the plurality of middle tier servers that enable the one or more of the plurality of middle tier servers to query for the extended assembly.

24. A computer program product as recited in claim 22, wherein the back end server includes an SQL server.

25. A computer program product as recited in claim 22, wherein the one or more of the plurality of middle tier servers includes an email server.

26. A computer program product as recited in claim 22, wherein the act of identifying the data type to be deployed includes determining that the one or more of the plurality of middle tier servers has requested the extended assembly, since the one or more of the plurality of middle tier servers are not yet enabled for the data type.

27. A computer program product as recited in claim 22, wherein the method further includes an act of adding a new middle tier server to the multi-tier system, and wherein the new middle tier server comprises the one or more of the plurality of middle tier servers that has requested the extended assembly.

28. A computer program product as recited in claim 22, wherein the method further includes an act of creating one or more object tables that are linked to the special table and that include additional information defining the data type to be deployed, and wherein the extended assembly also includes the additional information.

29. A computer program product as recited in claim 28, wherein the method further includes modifying at least one of the special table and the one or more object tables.

30. A method as recited in claim 1, wherein the extended assembly is a single data structure that includes all the data required to enable the one or more of the plurality of middle tier servers to use the data type.

31. A method as recited in claim 1, wherein the one or more of the plurality of middle tier servers have limited program code means to process data associated with less than all of the data types in the multi-tier system, and the back end server has all program code means to process any data associated with all of the data types in the multi-tier system.

32. A method as recited in claim 31, wherein the one or more of the plurality of middle tier servers are only equipped to recognize and process data objects associated with a particular data type when program code means comprising executable machine code of the extended assembly for the particular data type has been received from the back end server and installed at the one or more of the plurality of middle tier servers.

33. At a middle tier server in a multi-tier database server system that includes a back end database server at a first tier and a plurality of additional database servers at a middle tier, wherein the plurality of middle tier servers are configured to process data corresponding to data types defined by the back end server at the first tier, a method for deploying one or more data types from the back end server to the plurality of middle tier servers in a manner that maintains consistency and compatibility in the definitions of the data types and in code associated with each data type in the multi-tier database server system, the method comprising:

an act of receiving at a middle tier email exchange server one or more data objects from a back end SQL server, the one or more received data objects being associated with at least one data type;

an act of initiating one or more processing functions for the one or more received data objects associated with the at least one data type;

an act of identifying that the at least one data type of the one or more data objects is not recognized, such that the initiated one or more initiated processing functions have failed at the middle tier email exchange server;

an act of pulling one or more extended assemblies corresponding to the at least one data type from the back end SQL server, wherein the one or more extended assemblies were generated by the back end SQL server after the SQL server received a request from the middle tier email exchange server to pull the one or more extended assemblies, and in response thereto, wherein the back end SQL server acts as a repository for each data type used by any of the plurality of middle tier servers, as a single and centralized source from which each of the plurality of middle tier servers obtains all extendable assemblies corresponding to all data types used by any other of the plurality of middle tier servers, and as a single and centralized location at which all data types for the middle tier servers are modified, and such that the plurality of middle tier servers each obtain all data types from, and modify all data types at, the single and centralized source which operates at a different tier than the plurality of middle tier servers, and wherein the back end SQL server generates the extended assembly by using a special table in a database of the back end server, the special table including a plurality of data elements storing data identifying data types usedly the plurality of middle tier servers, each data element being specific to a particular data type and including:

a data type identification field having a unique identification for the corresponding data type;

a data name field identifying a name of the corresponding data type;

a code field containing executable code necessary for enabling the middle tier email server to use the corresponding data type; and a link to at least one data type specific table that contains information further defining the corresponding data type; and an act of processing the one or more data objects associated with the at least one data type using the pulled one or more extended assemblies, wherein the middle tier email exchange server successfully recognizes the at least one data type, and successfully processes the one or more received data objects associated with the at least one data type.

34. A method as recited in claim 33, wherein the one or more pulled extended assemblies comprise computer-executable instructions that, when executed at the middle tier server, cause one or more processors at the middle tier server to format the one or more data objects so that the one or more data objects can be processed.

* * * * *